(12) United States Patent
Furuhashi (10) Patent No.: US 6,427,181 B1
(45) Date of Patent: Jul. 30, 2002

(54) METHOD OF AND APPARATUS FOR PROCESSING INFORMATION, AND PROVIDING MEDIUM

(75) Inventor: Makoto Furuhashi, Tokyo (JP)

(73) Assignee: Sony Computer Entertainment Inc., Tokyo (JP)

(*) Notice: Subject to any disclaimer, the term of this patent is extended or adjusted under 35 U.S.C. 154(b) by 0 days.

(21) Appl. No.: 09/339,815

(22) Filed: Jun. 25, 1999

(30) Foreign Application Priority Data

Jun. 26, 1998 (JP) .......................................... 10-180014

(51) Int. Cl.[7] .............................................. G06F 13/00

(52) U.S. Cl. .......................................... 710/300; 713/2

(58) Field of Search ................................ 710/300, 113, 710/119, 309, 260; 713/2

(56) References Cited

PUBLICATIONS

U.S. application No. 09/346,673 by Makoto Furuhashi, filed on Jul. 2, 1999, status pending.
U.S. application No. 09/339,220 by Makoto Furuhashi, filed on Jun. 24, 1999, status pending.

*Primary Examiner*—Peter Wong
*Assistant Examiner*—X. Chung-Trans
(74) *Attorney, Agent, or Firm*—Paul A Guss (57) ABSTRACT

A video entertainment system includes a media processor for processing information. The media processor has a system bus with an external device connected thereto, a bus arbiter for providing the right to use the system bus to the external device in response to a request from the external device, a DRAM for storing a program supplied from the external device via the system bus, and digital signal processors for executing a predetermined process based on the program supplied from the DRAM. A CPU manages the process executed by the digital signal processors based on the program supplied from the DRAM.

14 Claims, 8 Drawing Sheets

FIG. 1

VIDEO ENTERTAINMENT SYSTEM 1

METHOD OF AND APPARATUS FOR PROCESSING INFORMATION, AND PROVIDING MEDIUM

BACKGROUND OF THE INVENTION

1. Field of the Invention

The present invention relates to a method of and an apparatus for processing information, and a providing medium, and more particularly to a method of and an apparatus for transferring data efficiently at high speed, and a providing medium for providing a program and/or data to carry out such a method.

2. Description of the Related Art

In recent years, graphic computers and video entertainment systems are required to perform high-speed signal processing for making displayed images highly realistic and impressive. To meet the requirement, it has been attempted to incorporate in such graphic: computers and video entertainment systems a plurality of DSPs (Digital Signal Processors) for executing floating-point product-sum calculations at high speed, the DSPs being mounted, together with a CPU, a memory device, and other necessary semiconductor devices, on a circuit board for parallel signal processing.

For designing a desired circuit with the DSPs mounted on the circuit board, however, the memory device needs to be of a large bit width configuration for transferring data at a high rate. In order to be used with the memory device of a large bit width configuration, the DSPs are required to have a number of terminals, resulting in an increased DSP package size. If a general-purpose memory device is to be used, then a plurality of such general-purpose memory devices because each one of the general-purpose memory devices has a small storage capacity. For the above reasons, the circuit board is necessarily large in size, and interconnections between devices, e.g., interconnections between the memory device and the DSPs, are long, so that signal transfer delays will be caused by stray capacities on the circuit board. As a result, signals cannot be transferred efficiently at a high, rate. Furthermore, as the number of devices used increases, their power consumption and heat generation increase. The large-size circuit board tends to degrade itself soon.

A bootstrap program for the graphic computers and video entertainment systems is fixedly stored in a built-in ROM. Therefore, even when a bug in the bootstrap program is found, it is difficult to eliminate the bug from the bootstrap program.

SUMMARY OF THE INVENTION

It is therefore an object of the present invention to increase the signal processing capability of an apparatus such as a graphic computer or a video entertainment system, and allow a program in such an apparatus to be easily modified.

The above and other objects, features, and advantages of the present invention will become more apparent from the following description when taken in conjunction with the accompanying drawings in which preferred embodiments of the present invention are shown by way of example.

DESCRIPTION OF THE PREFERRED EMBODIMENT

Figure 1:
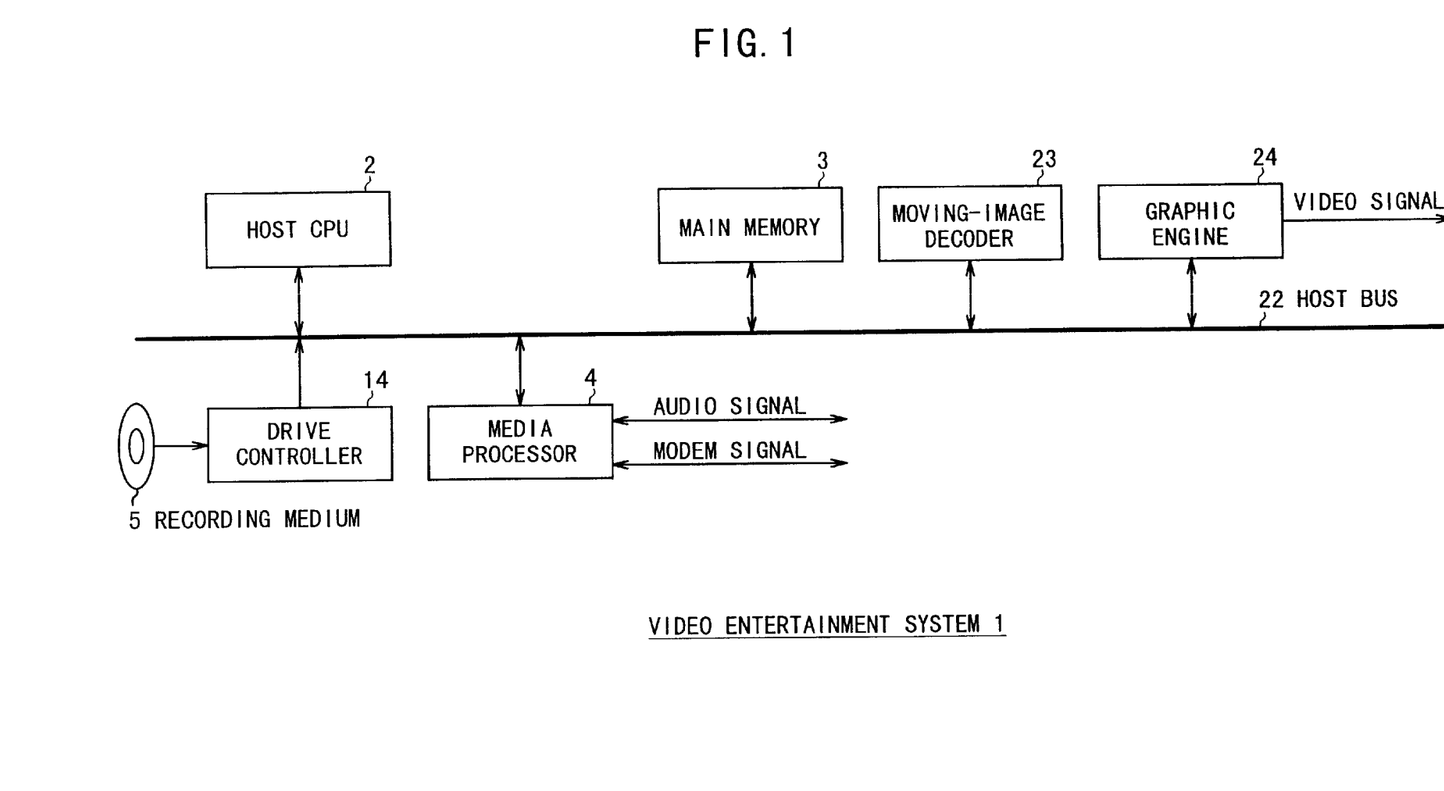
FIG. 1 is a block diagram of a video entertainment system which incorporates the principles of the present invention.

FIG. 1 shows in block form a video entertainment system 1 which incorporates the principles of the present invention. As shown in FIG. 1, the video entertainment system 1 has a host CPU (Central Processing Unit) 2 for controlling a media processor 4 according to a program which has been transferred from a recording medium 5 to a main memory 3 via a drive controller 14 and a host bus 22. When the video entertainment system 1 starts to operate, a bootstrap program is read from the recording medium 5 by the host CPU 2, which may be a CD-ROM (Compact Disk—Read-Only Memory), a DVD-ROM (Digital Video Disk—Read-Only Memory), or the like, into the main memory 3, and then transferred from the main memory 3 to the media processor 4, which may be regarded as an information processing apparatus, which then executes the bootstrap program. The main memory 3 comprises a RAM (Random-Access Memory), for example, and serves to store programs and data necessary to operate the host CPU 2. The recording medium 5 stores, in addition to the bootstrap program, application programs, audio signal data (including compressed data), video signal data (including compressed data), and other data.

After having executed the bootstrap program supplied via the host bus 22 by the host CPU 2, the media processor 4 reads an application program and necessary data supplied from the recording medium 5 via the main memory 3 by the host CPU 2. The media processor 4 also processes data to output an audio signal, processes a separately entered audio signal, and receives and outputs communication data for a modem or the like, according to the application program.

A moving-image decoder 23 decodes compressed graphic data supplied from the main memory 3 and returns the decoded graphic data to the main memory 3, which stores the decoded graphic data. A graphic engine 24 processes the decoded graphic data, which has been supplied from the main memory 3 via the host bus 22, into a video signal, and outputs the video signal.

If the media processor 4 is regarded as an information processing apparatus, then the other components including the host CPU 2, the main memory 3, and the host bus 22 may be regarded as external devices.

Figure 2:
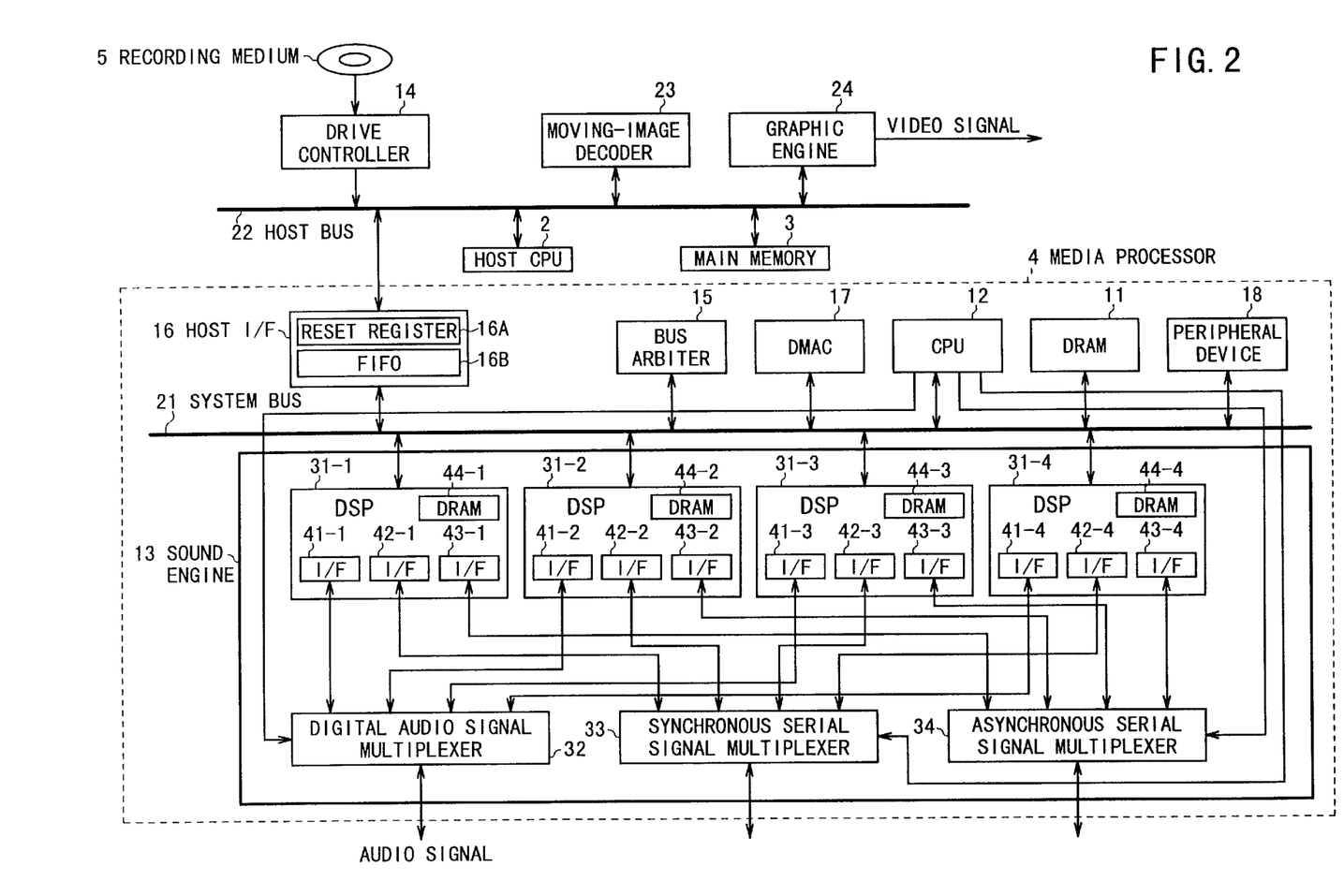
FIG. 2 is a block diagram of a media processor in the video entertainment system shown in FIG. 1.

FIG. 2 shows in block form the media processor 4, which comprises a single LSI circuit. As shown in FIG. 2, a DRAM (Dynamic RAM) 11 stores the bootstrap program supplied by the host CPU 2 and also stores data required for the operation of and a program to be executed by a CPU 12, which functions also as a management means and a control means, and a sound engine 13. The CPU 12 executes various processing operations according to the program stored in the DRAM 11. For example, the CPU 12 executes an initializing process according to the bootstrap program transferred from the DRAM 11.

A bus arbiter 15, serving as an arbitration means for arbitrating or providing the right to use a system bus 21.

A host I/F (interface) 16 is connected to the host CPU 2 by the host bus 22 and is also connected to the system bus 21. The host I/F 16 comprises a reset register 16A and a FIFO (First-In, First-Out) memory 16B.

When a transfer request from the host CPU 2 is transmitted via the host I/F 16 to the CPU 12, the CPU 12 outputs the transfer request to a DMA (Direct Memory Access) controller (DMAC) 17. The DMA controller 17 then acquires the right to use the system bus 21 through the bus arbiter 15, and transfers the program and data from the host CPU 2 via the FIFO memory 16B to the DRAM 11 according to a DMA transfer process.

A peripheral device 18 comprises a timer for performing clock operation and an interrupt controller for generating interrupt pulses at preset periodic intervals.

The sound engine 13 comprises four DSPs 31-1 through 31-4 (also collectively referred to as a "DSP 31W") as an executing means for executing a certain process, a digital audio signal multiplexer 32, a synchronous serial signal multiplexer 33, and an asynchronous serial signal multiplexer 34.

The DSP 31-1 comprises a digital audio signal I/F 41-1, a synchronous serial signal I/F 42-1, and an asynchronous serial signal 43-1, which are connected respectively to the digital audio signal multiplexer 32, the synchronous serial signal multiplexer 33, and the asynchronous serial signal multiplexer 34.

The digital audio signal I/F 41-1 and the synchronous serial signal I/F 42-1 transfer data in synchronism with a clock signal. The asynchronous serial signal I/F 43-1 transfer data based on RS-232C. The DSP 31-1 is connected to the system bus 21 for reading a program and data from the DRAM 11 via the system bus 21 and storing the program and data in a built-in DRAM 44-1.

The DSPs 31-2 through 31-4 are identical in structure to the DSP 31-1. The DSPs 31-2 through 31-4 comprise respective digital audio signal I/Fs 41-2 through 41-4, respective synchronous serial signal I/Fs 42-2 through 42-4, respective asynchronous serial signal I/Fs 43-2 through 434, and respective DRAMs 44-2 through 44-4. The DSPs 31-2 through 31-4 are corrected to the system bus 21, the digital audio signal multiplexer 32, the synchronous serial signal multiplexer 33, and the asynchronous serial signal multiplexer 34.

The digital audio signal multiplexer 32 multiplexes digital audio signals supplied from the digital audio signal I/Fs 41-1 through 41-4 of the DSPs 31-1 through 31-4. The synchronous serial signal multiplexer 33 multiplexes digital audio signals supplied from the digital audio signal I/Fs 42-1 through 42-4 of the DSPs 31-1 through 31-4. The asynchronous serial signal multiplexer 34 multiplexes digital audio signals supplied from the digital audio signal I/Fs 43-1 through 43-4 of the DSPs 31-1 through 31-4. The multiplexers 32, 33, 34 also serve as transfer means for transferring data in bypassing relation to the system bus 21.

The media processor 4 is fabricated as one semiconductor device (LSI circuit) for thereby allowing the system bus 21 to have a large bit width (128 bits in the illustrated embodiment). Since the delay in accessing the DRAM 11 is small, data can be transferred between the DRAM 11 and the CPU 12, the DSPs 31-1 through 31-4 at a high rate and hence frequently. Therefore, the DRAMs 44-1 through 44-4 of the DSPs 31-1 through 31-4 may be of a relatively small storage capacity.

Figure 3:
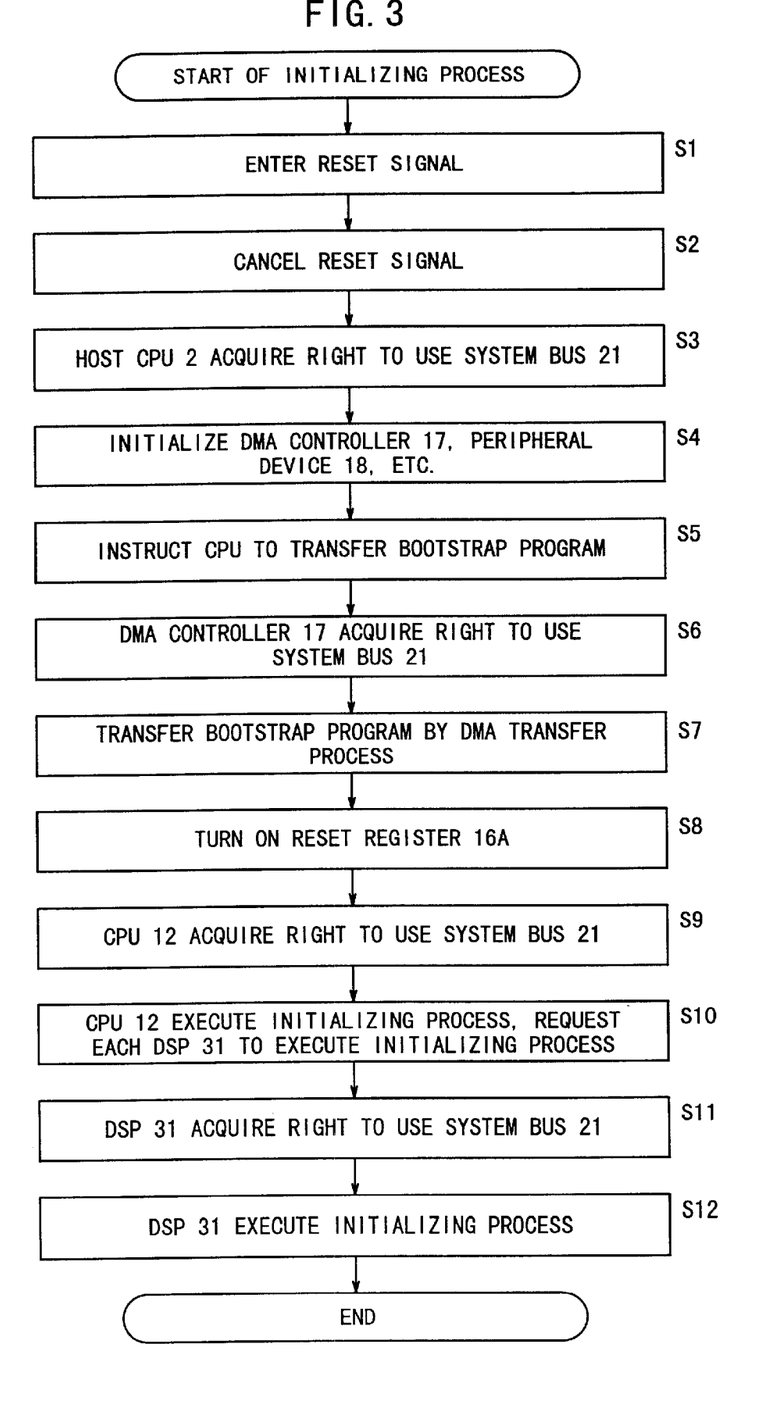
FIG. 3 is a flowchart of an initializing process of the video entertainment system.

An initializing process for initializing the video entertainment system 1 shown in FIGS. 1 and 2 will be described below with reference to FIG. 3.

First, the host CPU 2 supplies the media processor 4 with a reset signal (e.g., a signal having a low level) via a dedicated reset line (not shown) in step S1. The resources in the media processor 4, i.e., the CPU 12, the DSPs 31, the bus arbiter 15, etc. are reset by the reset signal. At this time, the reset register 16A of the host I/F 16, which manages reset states of the CPU 12 and the DSPs 31, is turned on (reset).

When the host CPU 2 disables the reset signal, i.e., changes the reset signal from the low level to the high level, in step S2, the CPU 12 and the DSPs 31 (accurately their cores) remain reset (the reset register 16A remains turned on), but the other resources, e.g., the bus arbiter 15 and the DMA controller 17, are released from their reset states. Then, the host CPU 2 requests the bus arbiter 15 for the right to use the system bus 21 via the host I/F 16. The CPU 12 and the DSPs 31 do not request the bus arbiter 15 for the right to use the system bus 21 because they are still being reset. Therefore, the bus arbiter 15 gives the host CPU 2 the right to use the system bus 21 in step S3.

In step S4, the host CPU 2 initializes the DMA controller 17, the peripheral device 18, etc.

In step S5, the host CPU 2 instructs the CPU 12 to transfer the bootstrap program stored in the main memory 3. When the DMA controller 17 requests the bus arbiter 15 for the right to use the system bus 21 in response to the instruction to transfer the bootstrap program, the bus arbiter 15 gives the DMA controller 17 the right to use the system bus 21 in step S6.

In step S7, the DMA controller 17 effects a DMA transfer of the bootstrap program from the main memory 3 via the system bus 21 to the DRAM 11.

In step S8, the host CPU 2 turns off the reset register 16A of the host I/F 16, i.e., releases the reset register 16A from its reset state. The CPU 12 and the DSPs 31 are now released from their reset states.

When the CPU 12 requests the bus arbiter 15 for the right to use the system bus 21, the bus arbiter 15 gives the CPU 12 the right to use the system bus 21 in step S9. In step S10, the CPU 12 receives the bootstrap program transferred from the DRAM 11, and executes an initializing process. The CPU 12 also controls the DSPs 31 to execute an initializing process.

In step S11, each of the DSPs 31-1 through 31-4 requests the bus arbiter 15 for the right to use the system bus 21. When each of the DSPs 31-1 through 31-4 is given the right to use the system bus 21, each of the DSPs 31-1 through 31-4 receives the bootstrap program transferred from the DRAM 11, and executes an initializing process. The host CPU 2 may control the DSPs 31 to execute an initializing process, rather than having the CPU 12 control the DSPs 31 to execute an initializing process.

Inasmuch as the host CPU 2 provides the bootstrap program stored in the main memory 3 to the DRAM 11, and the CPU 12 and the DSPs 31 are supplied with the bootstrap program from the DRAM 11 to execute an initializing process, the bootstrap program can be modified when necessary. Consequently, when a bug is found in the bootstrap program, the bootstrap program may be improved, and the improved bootstrap program may be stored in the main memory 3. Other programs may similarly be debugged and stored.

Because the host CPU 2 is able to obtain the right to use the system bus 21, the host CPU 2 can use resources of the media processor 4 and know their states. Accordingly, the debugging process is facilitated when a program is developed.

Figure 4:
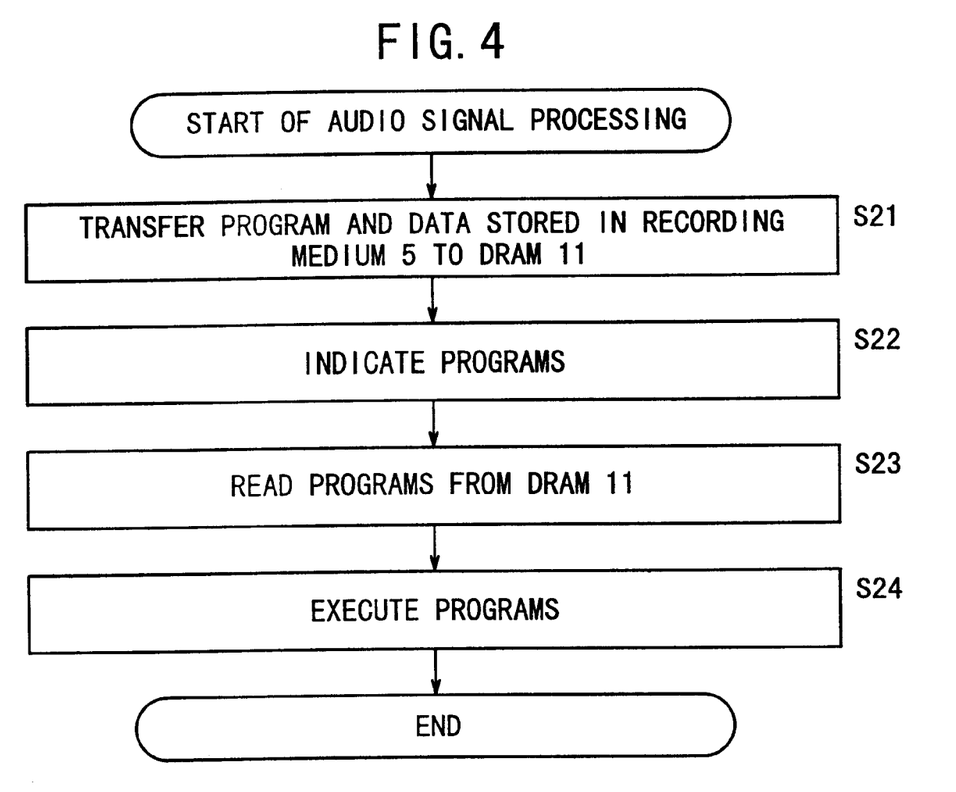
FIG. 4 is a flowchart of an audio signal processing sequence of the video entertainment system.

An audio signal processing sequence of the video entertainment system 1 will be described below with reference to FIG. 4.

In step S21, the host CPU 2 controls the drive controller 14 to read programs and necessary data from the recording medium 5 and supply them to the FIFO memory 16B, which stores the supplied program and data. The DMA controller 17 then transfers the data stored in the FIFO memory 16B to the DRAM 11 according to a DMA transfer process.

In step S22, the CPU 12 indicates programs to be executed to the DSPs 31-1 through 31-4. In step S23, the DSPs 31-1 through 31-4 request the bus arbiter 15 for the right to use the system bus 21. When the DSPs 31-1 through 31-4 are given the right to use the system bus 21, the DSPs 31-1 through 31-4 read desired programs from the DRAM 11 and store them in the respective built-in DRAMs 44-1 through 44-4 in step S23.

In step S24, the DSPs 31-1 through 31-4 execute the programs stored in the DRAMs 44-1 through 44-4. For example, the DSPs 31-1 through 31-4 execute a speech synthesis process, a sound synthesis process, a speech recognition process, and a sound effect process. The DSPs 31-1 through 31-4 read data necessary to execute the programs directly from the DRAM 11, but not via the CPU 12.

In this manner, the DSPs 31-1 through 31-4 read programs recorded in the recording medium 5 to process audio signals.

Modes of operation of the digital audio signal multiplexer 32 will be described below with reference to FIGS. 5 through 7. The digital audio signal multiplexer 32 shown in FIGS. 5 through 8 comprises five switches 51-1 through 51-5. The switches 51-1 through 51-5 have respective terminals connected to the digital audio signal I/Fs 41-1 through 41-4 of the DSPs 31-1 through 31-4, respectively, and respective other terminals connected in common to a terminal of a switch 51-5. The other terminal of the switch 51-5 is connected to an external unit such as a speaker or a microphone (not shown).

Figure 8:
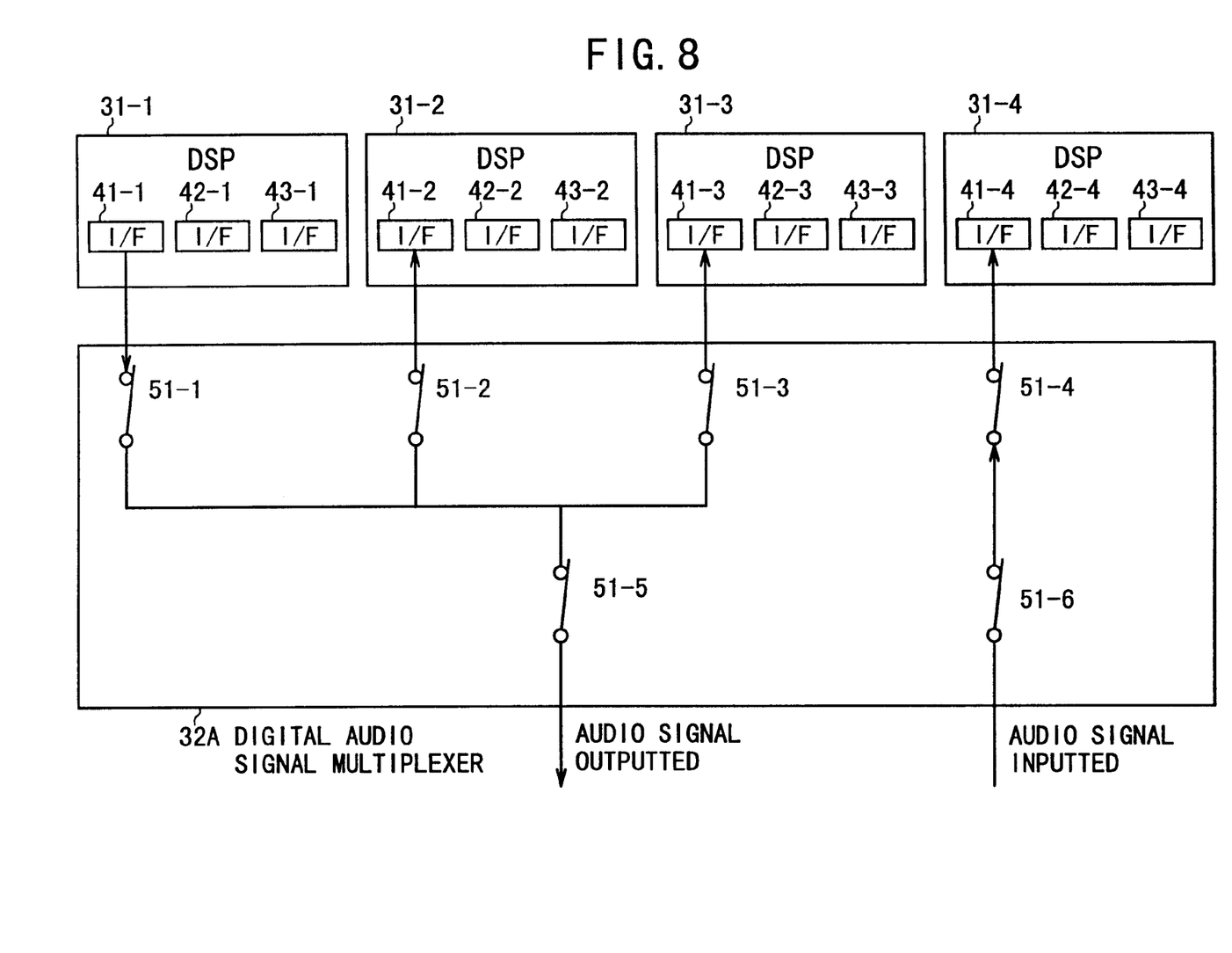
FIG. 8 is a block diagram of a modified digital audio signal multiplexer.

FIG. 8 shows a modified digital audio signal multiplexer 32A that can be incorporated in the sound engine 13. As shown in FIG. 8, the modified digital audio signal multiplexer 32A comprises six switches 51-1 through 51-6. The switches 51-1 through 51-3 have respective terminals connected to the digital audio signal I/Fs 41-1 through 41-3 of the DSPs 31-1 through 31-3, respectively, and respective other terminals connected in common to a terminal of a switch 51-5. The other terminal of the switch 51-5 is connected to an external unit such as a speaker or a microphone (not shown). The switch 51-4 has a terminal connected to the digital audio signal I/F 41-4 of the DSP 31-4 and the other terminal to an external unit such as a speaker or a microphone (not shown).

Figure 5:
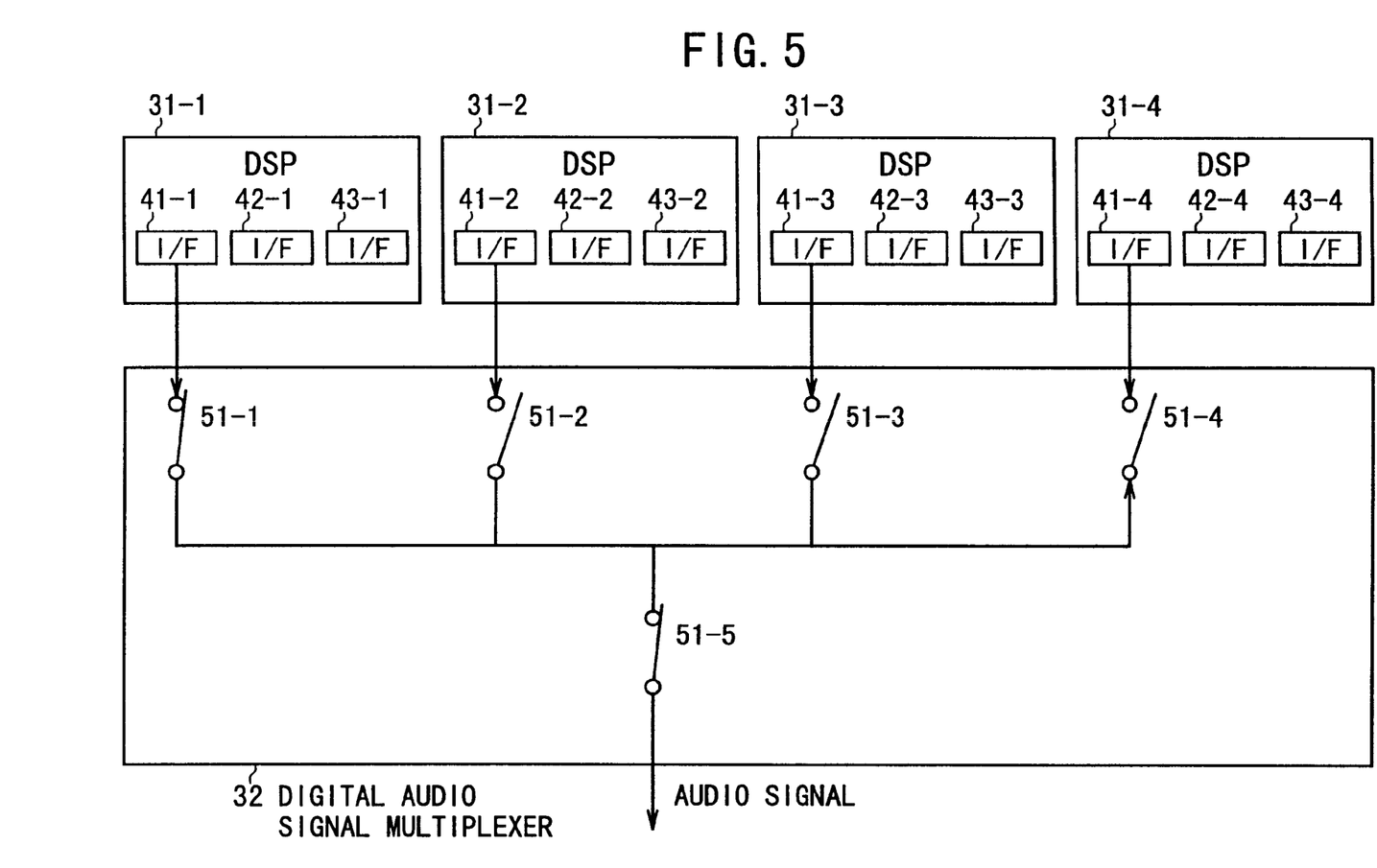
FIG. 5 is a block diagram illustrative of a mode of operation of a digital audio signal multiplexer in the media processor.

In FIG. 5, the DSPs 31-1 through 31-4 are in an audio signal output mode, and the switches 51-1, 51-5 are turned on and the switches 51-2 through 51-4 are turned off. With these DSP and switch settings, an audio signal outputted from the DSP 31-1 is outputted via the switch 51-5 to the external unit. Therefore, in the mode of operation shown in FIG. 5, an audio signal outputted from either one of the DSPs 31-1 through 31-4 can be selected and outputted to the external unit.

Figure 6:
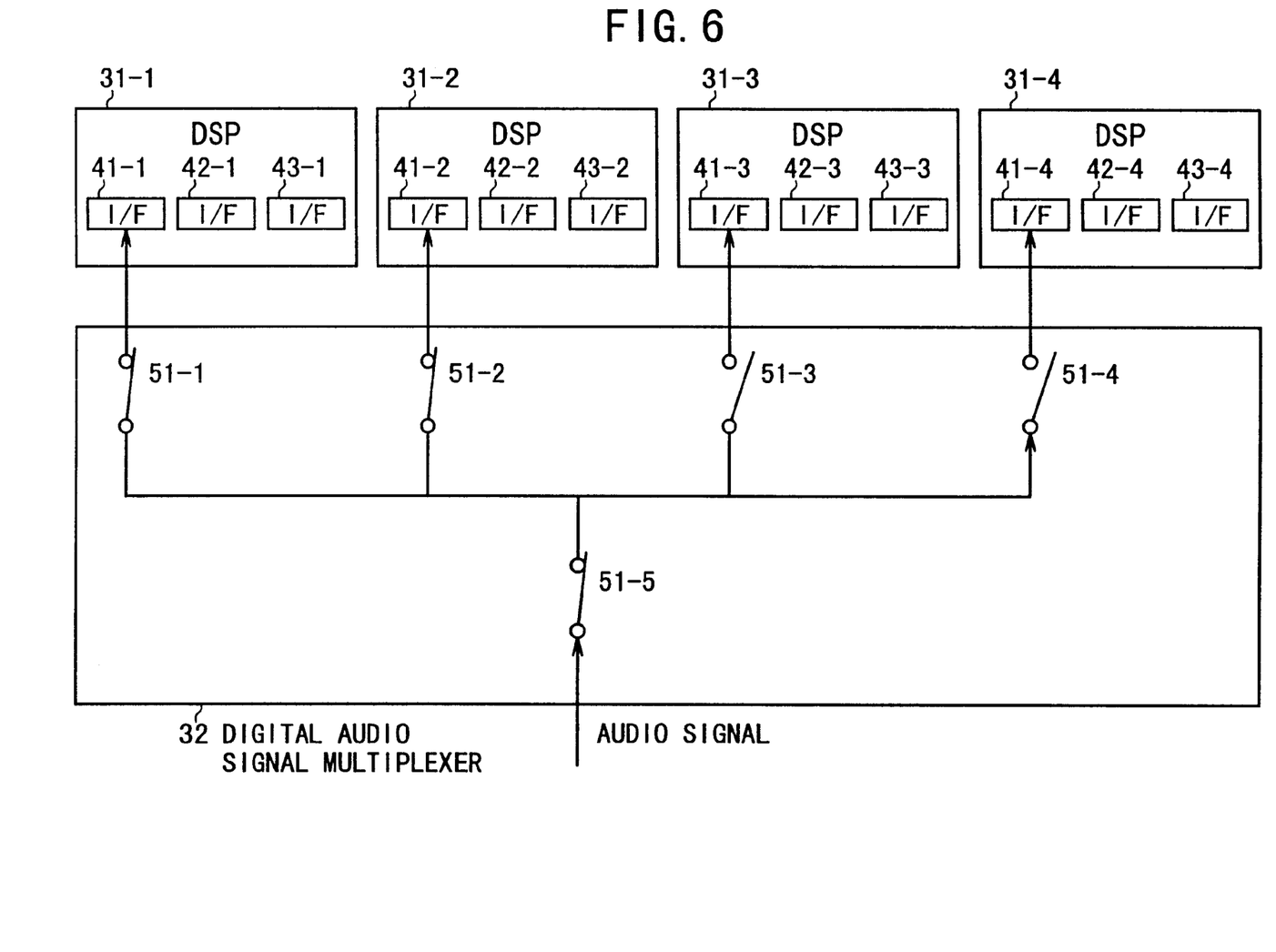
FIG. 6 is a block diagram illustrative of another mode of operation of the digital audio signal multiplexer.

In FIG. 6, the DSPs 31-1 through 31-4 are in an audio signal input mode, and the switches 51-1, 51-2, 51-5 are turned on and the switches 51-3, 51-4 are turned off. With these DSP and switch settings, an audio signal inputted from the external unit is applied to the DSPs 31-1, 31-2. Therefore, in the mode of operation shown in FIG. 6, an audio signal inputted from the external unit can be inputted to one or more of the DSPs 31-1 through 31-4.

Figure 7:
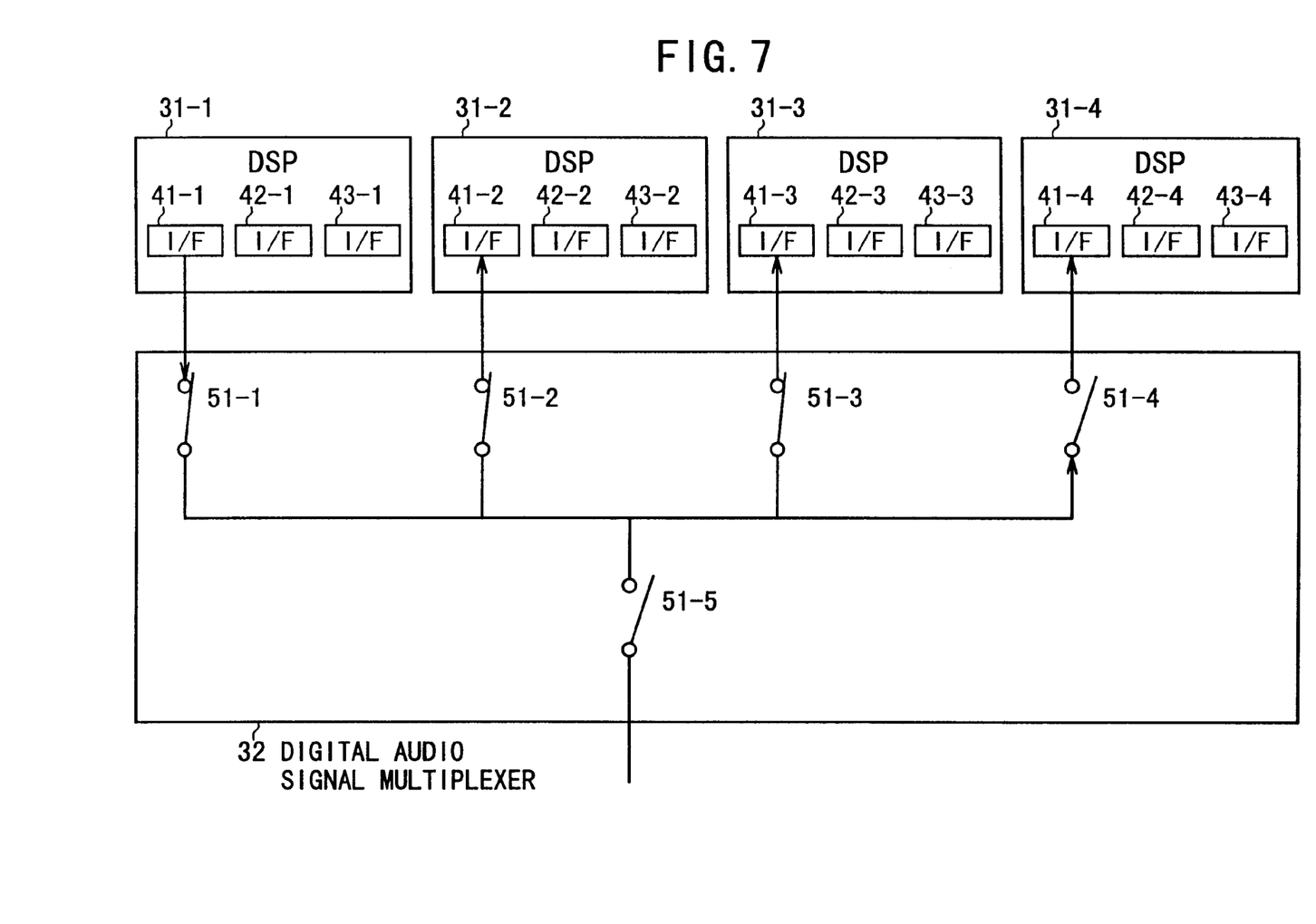
FIG. 7 is a block diagram illustrative of still another mode of operation of the digital audio signal multiplexer.

In FIG. 7, the DSP 31-1 is in an audio signal output mode, and the DSPs 31-2, 31-3 are in an audio signal input mode. The switches 51-1 through 51-3 are turned on, and the switches 51-4, 51-5 are turned off. With these DSP and switch settings, an audio signal outputted from the DSP 31-1 is supplied to the DSPs 31-2, 31-3. Accordingly, data can be transferred between the DSPs 31-1 through 31-4 in bypassing relation to the system bus 21.

In FIG. 8, the DSP 31-1 is in an audio signal output mode, and the DSPs 31-2, 31-3, 31-4 are in an audio signal input mode. The switches 51-1 through 51-6 are turned on. With these DSP and switch settings, an audio signal outputted from the DSP 31-1 is supplied to the DSPs 31-2, 31-3, and outputted via the switch 51-5 to the external unit connected thereto. Furthermore, an audio signal outputted from the external unit connected to the switch 51-6 is supplied to the DSP 31-4 via the switches 51-6, 51-4.

The synchronous serial signal multiplexer 33 and the asynchronous serial signal multiplexer 34 are basically identical in structure to the digital audio signal multiplexer 32 or digital audio signal multiplexer 32A. Therefore, the synchronous serial signal multiplexer 33 and the asynchronous serial signal multiplexer 34 can process synchronous and asynchronous serial signals, respectively, in the manner described above with reference to FIGS. 5 through 8.

Since signals inputted to and outputted from the digital audio signal multiplexer 32 or 32A, the synchronous serial signal multiplexer 33, and the asynchronous serial signal multiplexer 34 are controlled as described above with reference to FIGS. 5 through 9, data can be transferred highly efficiently at a high rate.

The term "system" used herein represents an overall arrangement made up of a plurality of units, devices, means, or individual components.

A providing medium for providing a computer program and/or data which carries out the above processing to the user may comprise any of various information recording mediums including a magnetic disk, an optical disk such as a CD-ROM, a solid-state memory, etc., and any of various information transmission mediums used in networks and satellite systems, etc.

According to the present invention, because the right to use the bus is given to an external device, the programs can easily be modified.

Furthermore, inasmuch as data can be transferred in bypassing relation to the system bus, the data can be transferred efficiently at a high rate.

Although certain preferred embodiments of the present invention have been shown and described in detail, it should be understood that various changes and modifications may be made therein without departing from the scope of the appended claims.

What is claimed is:

1. An apparatus for processing information, comprising:
a bus with an external device connected thereto, said external device comprising a host CPU for reading a program, a main memory for storing the program, and a host bus connected to said host CPU and said main memory;

an interface connected between said host bus and said bus;

arbitrating means for providing the right to use said bus to the external device in response to a request from the external device;

memory means for storing a program supplied from the external device via said bus;

means for transferring the program stored in said main memory via said host bus, said interface, and said bus to said memory means;

executing means for executing a predetermined process based on the program supplied from said memory means; and management means for managing the process executed by said executing means based on the program supplied from said memory means.

2. An apparatus according to claim 1, wherein said program comprises a bootstrap program recorded in a recording medium when the apparatus starts to operate, wherein said main memory stores the bootstrap program read from the recording medium, and wherein the bootstrap program is transferred to said memory means according to a direct memory access transfer process.

3. An apparatus according to claim 2, wherein said recording medium stores audio signal data and/or video signal data, and wherein said external device processes said video signal data, and said apparatus processes said audio signal data.

4. An apparatus according to claim 3, wherein said bus, said memory means, said executing means, and said management means are incorporated in a single semiconductor device.

5. An apparatus according to claim 2, wherein said bus, said memory means, said executing means, and said management means are incorporated in a single semiconductor device.

6. An apparatus according to claim 1, comprising a recording medium storing audio signal data and/or video signal data, and wherein said external device processes said video signal data, and said apparatus processes said audio signal data.

7. An apparatus according to claim 6, wherein said bus, said memory means, said executing means, and said management means are incorporated in a single semiconductor device.

8. An apparatus according to claim 1, wherein said bus, said memory means, said executing means, and said management means are incorporated in a single semiconductor device.

9. A method of processing information in an information processing apparatus, comprising the steps of:

providing a bus with an external device connected thereto, said external device comprising a host CPU for reading a program, a main memory for storing the program, and a host bus connected to said host CPU and said main memory;

providing the right to use the bus to the external device in response to a request from the external device;

transferring the program stored in said main memory via said host bus, said interface, and said bus to a memory means;

storing in said memory means the program supplied from the external device via said bus;

executing a predetermined process based on the stored program; and managing the process being executed based on the stored program.

10. A providing medium for providing a program and/or data readable by a computer to control an information processing apparatus, to carry out a process comprising the steps of:

providing a bus with an external device connected thereto, said external device comprising a host CPU for reading a program, a main memory for storing the program, and a host bus connected to said host CPU and said main memory;

providing the right to use the bus to the external device in response to a request from the external device;

transferring the program stored in said main memory via said host bus, said interface, and said bus to a memory means;

storing in said memory means the program supplied from the external device via said bus;

executing a predetermined process based on the stored program; and managing the process being executed based on the stored program.

11. An apparatus for processing information, comprising:

N signal processing means comprising respective digital signal processors interconnected by a bus;

control means comprising a CPU connected to said signal processing means by said bus, for controlling operation of said signal processing means;

arbitration means comprising a bus arbiter for arbitrating the right to use said bus by said N signal processing means and said control means; and transfer means comprising respective multiplexers controllable by said control means, for transferring data between said N signal processing means in bypassing relation to said bus.

12. An apparatus according to claim 11, wherein the data transferred by said transfer means comprises audio signal data.

13. A method of processing information in an information processing apparatus, comprising the steps of:

providing N signal processing means comprising respective digital signal processors interconnected by a bus;

processing a signal with said N signal processing means;

controlling by a CPU operation of said N signal processing means;

arbitrating by a bus arbiter the right to use said bus in the step of processing a signal with said N signal processing means and the step of controlling operation of said N signal processing means; and transferring, via respective multiplexers controlled by said CPU, data between said N signal processing means in bypassing relation to said bus in the step of controlling operation of said N signal processing means.

14. A providing medium for providing a program and/or data readable by a computer to control an information processing apparatus, to carry out a process comprising the steps of:

providing N signal processing means comprising respective digital signal processors interconnected by a bus;

processing a signal with said N signal processing means;

controlling by a CPU operation of said N signal processing means;

arbitrating by a bus arbiter the right to use said bus in the step of processing a signal with said N signal processing means and the step of controlling operation of said N signal processing means; and transferring, via respective multiplexers controlled by said CPU, data between said N signal processing means in bypassing relation to said bus in the step of controlling operation of said N signal processing means.

* * * * *